(12) United States Patent
Schiffman et al.

(10) Patent No.: US 12,210,662 B2
(45) Date of Patent: Jan. 28, 2025

(54) PROTECTED PERIPHERAL PORTS

(71) Applicant: Hewlett-Packard Development Company, L.P., Spring, TX (US)

(72) Inventors: Joshua Serratelli Schiffman, Bristol (GB); Boris Balacheff, Meudon (FR); Richard Alden Bramley, Jr., Mansfield, MA (US); Valiuddin Ali, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 440 days.

(21) Appl. No.: 17/286,584

(22) PCT Filed: Nov. 26, 2019

(86) PCT No.: PCT/US2019/063449
§ 371 (c)(1),
(2) Date: Apr. 19, 2021

(87) PCT Pub. No.: WO2020/117570
PCT Pub. Date: Jun. 11, 2020

(65) Prior Publication Data
US 2021/0390216 A1 Dec. 16, 2021

(30) Foreign Application Priority Data
Dec. 6, 2018 (EP) .................................... 18306624

(51) Int. Cl.
*H04L 9/00* (2022.01)
*G06F 21/44* (2013.01)
(Continued)

(52) U.S. Cl.
CPC .............. *G06F 21/85* (2013.01); *G06F 21/44* (2013.01); *G06F 21/53* (2013.01); *G06F 21/554* (2013.01); *G06F 21/78* (2013.01)

(58) Field of Classification Search
CPC ........... G06F 21/85; G06F 21/44; G06F 21/53
(Continued)

(56) References Cited

U.S. PATENT DOCUMENTS

| 5,355,414 A | 10/1994 | Hale et al. |
| 7,392,398 B1 | 6/2008 | Shakkarwar |

(Continued)

FOREIGN PATENT DOCUMENTS

| CA | 2916622 A1 | 7/2016 |
| CN | 101281570 A | 10/2008 |

(Continued)

*Primary Examiner* — Christopher J Brown
(74) *Attorney, Agent, or Firm* — Knobbe, Martens, Olson & Bear, LLP

(57) ABSTRACT

According to aspect of the disclosure, there are provided methods and apparatus for connecting a peripheral device to a computer system, including an apparatus for interfacing with a peripheral device, the apparatus comprising a port configured to couple to the peripheral device, a processor, a memory coupled to the processor and comprising a software module comprising instructions that when executed on the processor protect the device from a peripheral device coupled to the port, and a hardware security controller coupled to the port, the hardware security controller configured to monitor execution of the software module by the processor and to disable the port in response to determining that the software module is not executing.

15 Claims, 4 Drawing Sheets

(51) Int. Cl.
*G06F 21/53* (2013.01)
*G06F 21/55* (2013.01)
*G06F 21/78* (2013.01)
*G06F 21/85* (2013.01)

(58) Field of Classification Search
USPC .......................................................... 726/26
See application file for complete search history.

(56) References Cited

U.S. PATENT DOCUMENTS

| | | |
|---|---|---|
| 8,424,088 B1 | 4/2013 | Kowalyshyn |
| 8,621,195 B2 | 12/2013 | Wang et al. |
| 8,869,308 B2 | 10/2014 | Soffer |
| 8,922,372 B2 | 12/2014 | Soffer |
| 9,098,333 B1 | 8/2015 | Obrecht et al. |
| 9,785,771 B1 * | 10/2017 | Pratt .................... G06F 21/554 |
| 9,916,479 B2 | 3/2018 | Jois et al. |
| 2008/0077801 A1 | 3/2008 | Ekberg |
| 2009/0212844 A1 | 8/2009 | Darmawan et al. |
| 2009/0217379 A1 * | 8/2009 | Chang .................... G06F 21/56 726/24 |
| 2011/0295707 A1 * | 12/2011 | Gui ...................... G06Q 20/206 705/64 |
| 2013/0318289 A1 * | 11/2013 | Tomlin .................. G06F 3/0688 711/112 |
| 2016/0196454 A1 * | 7/2016 | Soffer .................. H01R 13/665 726/16 |
| 2017/0364677 A1 * | 12/2017 | Soman ................ G06F 9/45558 |
| 2018/0293376 A1 | 10/2018 | El Abed et al. |
| 2018/0324179 A1 | 11/2018 | Hou |
| 2018/0365406 A1 * | 12/2018 | Elnekaveh ............ H04L 9/0897 |

FOREIGN PATENT DOCUMENTS

| | | |
|---|---|---|
| CN | 103620613 A | 3/2014 |
| EP | 1429226 A1 | 6/2004 |
| WO | 2012/135192 A2 | 10/2012 |

* cited by examiner

PROTECTED PERIPHERAL PORTS

BACKGROUND

Users frequently connect peripheral devices to input/output (I/O) ports of computer systems and devices. Common ports include Thunderbolt, eSATA, USB, etc. that may be used, for example, to connect mass storage devices such as hard drives and USB sticks or devices such as keyboards, printers, or the like.

BRIEF INTRODUCTION OF THE DRAWINGS

Various features of the present disclosure will be apparent from the detailed description which follows, taken in conjunction with the accompanying drawings, which together illustrate features of the present disclosure, and wherein.

DETAILED DESCRIPTION

Figure 1:
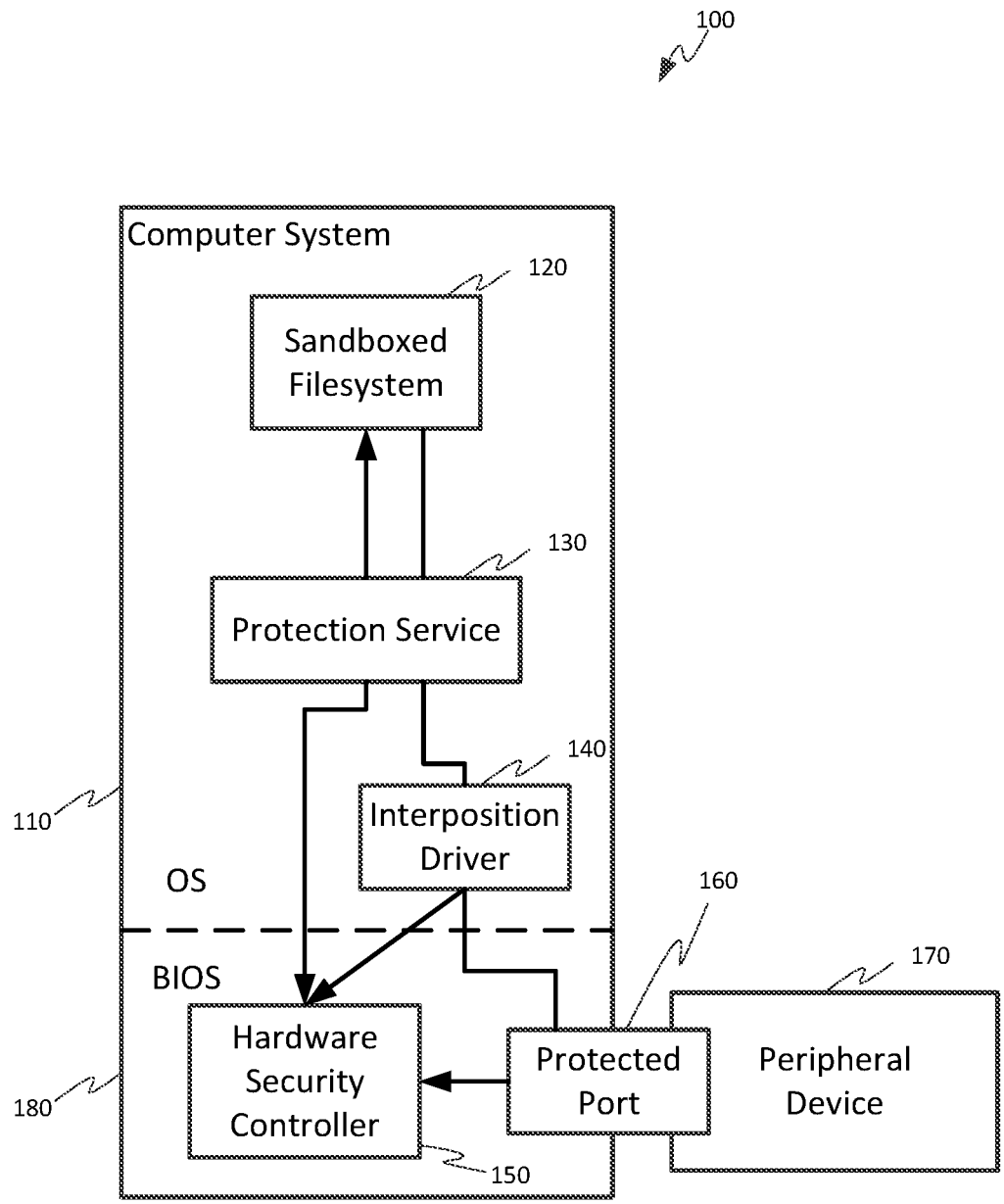
FIG. 1 illustrates a computer system according to an example of the disclosure.

In the following description, for purposes of explanation, numerous specific details of certain examples are set forth. Reference in the specification to "an example" or similar language means that a particular feature, structure, or characteristic described in connection with the example is included in at least that one example, but not necessarily in other examples.

Users frequently connect peripheral devices to personal computer I/O ports to share files (e.g. using eSATA, USB, and Thunderbolt ports). However, such ports may be open to misuse. In particular, an attacker may be able to create a peripheral device loaded with malicious code, or other functionality, that could result in a computer system being compromised when the peripheral is connected to a port of the computer system. Thus, users have become wary of using devices, such as USB drives, of unknown provenance. Furthermore, in a corporate setting, system administrators may respond by locking down ports or otherwise implementing a strictly policy regarding their use.

Securing PCs from malicious peripheral devices like USB sticks (Mass Storage) is difficult because it is hard for users to know whether those devices are harmful without first connecting them to a computer system. Attackers may be able to install malware on a USB drive that automatically executes upon insertion. More insidiously, seemingly benign USB devices can be reprogrammed to present multiple devices, such as keyboards, that can unexpectedly execute commands without the user's knowledge. As a result, IT administrators constantly warn users against insertion of untrustworthy devices or use restrictive policies to limit their use. These policies are often overly restrictive or impractical, but the alternative may be highly dangerous.

Some antivirus software may be able to provide some protection for a computer device from malicious software loaded onto a peripheral device. For example, antivirus tools may be used to automatically scan mass storage devices to detect and prevent execution of malicious code. However, these tools may have a large performance overhead and may not be guaranteed to stop more insidious attacks via the peripheral port. Furthermore, they may not be able to prevent enumeration of malicious virtual devices.

In response to the possibility of a computer system being compromised via a peripheral port, some users and administrators may simply disable all ports. This could be achieved in software via a BIOS setting, or through the use of hardware measures such as lockable port covers. While this approach removes the possibility of attacks via the port, it severely limits functionality of the computer system. Furthermore, in practice users may try to bypass the protections to reenable the ports when they find they wish to connect a peripheral device in the course of their work.

Some computer systems may be provided with protection mechanisms for isolating malicious inputs in a virtualized environment. However, in practice, these isolation mechanisms can sometimes be disabled by malware negating the protection provided. Furthermore, these protection mechanisms may disrupt the normal workflow of attaching and using peripherals.

Certain examples described herein provide methods and devices for protecting users from malicious mass storage devices, and other peripheral devices, by containing the device's contents and inputs within a hardware-enforced protect environment.

For the purposes of this disclosure, examples will be described in the context of USB devices, which may be the most commonly encountered. However, the skilled person will understand that the described techniques may easily be extended to other port types that can be used to connect mass storage devices to a computer, such as eSATA, PCIE, Thunderbolt, etc.

A USB device has at least four wires, one each for Power, Ground, Data+, and Data−. When the device is inserted into a USB port, a change on the Data lines is detected by the bus master (USB host). This triggers a device interrogation process. The host first determines the device speed (USB Version) and then resets the device. After reset, the host queries various USB device descriptors using the Get_Device_Descriptor command to determine what type of device it is. The device is expected to return values programmed by the manufacturer, which informs the host which device drivers should be loaded to handle the device. Much of this process is automated by the hardware, USB host controller, and drivers to improve performance. As a result, there may typically be limited visibility into this process without custom drivers or modifications.

A USB mass storage device is typically loaded immediately after enumeration and depending on the OS's settings, the filesystem may be mounted and any autoexecute files automatically launched. This presents a primary attack vector for maliciously planted USB drives.

Another potential attack is to reprogram the USB device firmware to present itself as a different device, such as a keyboard, instead of a mass storage device. The values returned by the device to identify the device type during enumeration may be easy to fake as they are unauthenticated. Thus, a USB storage stick may appear to the host as a keyboard or mouse. Once loaded, the firmware of the USB storage stick may be able to enter keystrokes to launch commands. Alternatively, a USB keyboard may enumerate as a USB mass storage device containing malicious software.

Finally, the device can present the correct device and later enumerate a second device when the user is not paying attention. Two possible methods for this include 1) resetting the device after a delay to enumerate a new device and 2) enumerating a USB hub that can present any number of devices in the future.

According to some examples of the present disclosure, methods and apparatus are provided to mitigate against these, and similar, potential attacks via a peripheral port. Examples provide a software OS protection agent to protect a host OS environment from a connected peripheral device, along with a hardware/firmware agent that monitors the software protection agent to ensure that the protection agent is operating correctly. Upon insertion of the peripheral, the OS protection agent and driver can properly protect the host OS environment from the peripheral. The agent is monitored by the hardware/firmware component that ensures the protection agent is running correctly before enumerating the device to the OS.

In some examples, if the peripheral is a storage device, the user may be presented with the stored files, which are prevented from executing on the system. If the peripheral is some other device type, the agent may ask the user if they wish to use it normally.

FIG. 1 illustrates a computer system 100 according to an example of the disclosure. The computer system 100 includes an operating system (OS) portion 110 and a low level hardware or BIOS portion 180. A peripheral device 170 is coupled to the computer system 100 via a protected port 160. A software protection module comprising protection service 130 and interposition driver 140 execute in the OS portion 110 of the device 100. The interposition driver 140 and protection service 130 are monitored by hardware security controller 150 resident in the BIOS portion 180.

In examples, the hardware security controller 150 may be realised as a separate hardware-based microcontroller such as a watchdog microcontroller (MCU) or may be provided as a firmware routine forming part of the system BIOS software.

In use, a port may be designated as a protected port 160 by default, or by a user or administrator explicitly designating that a port should be protected, e.g. based on a BIOS or operating system setting.

An interposition driver 140 is loaded in response to any USB device enumerated onto the protected port 160 before any device specific driver is loaded. The interposition driver 140 communicates with the protection service 130 and indicates that a new device has been detected. The protection service 130 is responsible for mediating devices 170 that are connected to the port.

For mass storage devices, it may load the filesystem in a sandboxed (e.g. virtualized) environment 120, which may then be presented to the user. For example, the sandboxed filesystems may present the files in a web browser executed in a virtual environment to allow the user to read any files stored on the device while isolating the files from the operating system 110 of the device 100.

In the case that the connected peripheral device 170 is not a mass storage device, for example a keyboard, the protection service 130 may prompt a user that a device claiming to be a particular device class is trying to enumerate on the protected port 160. If the user accepts the peripheral device 170, the protection service 130 may load the corresponding device driver to allow the device to operate on the computer system 100.

According to examples, a predefined policy may be provided, for example by an administrator, such that the protection service 130 may allow certain device types to load automatically. Similarly, a peripheral device 170 may be provided with an authorization value (e.g. a one time secret) that is detected by the protection service 130 and/or interposition driver 140 and facilitates automatic enumeration of the device and loading of the corresponding device drivers, bypassing the protection service.

For example, a user may have a particular USB storage device that they own and wish to regularly use to transfer files to/from the computer system 100. As the device is owned by the user, the user may trust the device not to contain any malicious code. By storing a suitable authorization value on the known device, the protection service 130 may be bypassed, avoiding delays when connecting the device to the computer system 100. In this way, the use of well-known and trusted devices is not affected by the presence of the protection service 130.

The protection service 130 and interposition driver 140 are further monitored at runtime by a hardware-based security controller 150, or watchdog microcontroller. This watchdog checks that the protection service is running correctly and has not been disabled by malware or a malicious user. If the security controller 150 determines that the protection service 130 or the interposition driver 140 are not loaded and executing, the security controller 150 disables the protected port 160 to prevent misuse.

According to an example, the hardware-based security controller 150 may receive periodic messages from the protection service 130 including a cryptographic value to allow the hardware-based security controller 150 to verify that the protection service 130 is executing correctly. The hardware-based security controller 150 can set/reset a timer based on receiving a verified message from the protection service 130. if the timer fails to be reset within a certain period of time the hardware-based security controller 150 may determine that the protection service 130 is not executing.

According to an example, when the computer system 100 first boots, a new shared secret value may be generated, for example a random number of a certain number of bytes, e.g. 32 bytes, and shared between the hardware security controller and the protection service. This secret value may be generated by the hardware security controller 150. The shared secret value may be stored in a secure store, such as a trusted platform module (TPM), accessible to the protection service 130, but protected from other processes; may be provided to the protection service 130 in encrypted form and decrypted based on a value stored in the TPM, with use of the value stored in the TPM disabled after boot; retrieved from the firmware using a one-time API call early in the boot process before any user processes are executed, etc. Once the protection service has obtained the shared secret, the shared secret value may be protected using the Data Protection Application Programming Interface, virtualization, etc.

At regular intervals the protection service 130 uses the shared secret value along with a nonce (number used once) value, such as an incrementing counter, to generate the cryptographic value contained within the periodic message to be sent to the hardware security controller 150. For example, the protection service 130 may generate a hash-based message authentication code (HMAC) value using the shared secret and the nonce. This message is then provided to the hardware security controller 150.

Upon receiving the message, the hardware security controller 150 determines that the cryptographic value, e.g. HMAC, has been correctly generated based on the shared secret, and that the cryptographic value has not previously been received, i.e. the nonce is not repeated to avoid replay attacks. If the cryptographic value is successfully verified, then the timer is reset and the hardware security controller 150 considers the protection service 130 to be executing correctly.

This provides a hardware failsafe that prevents the protected port 160 from being used while in pre-boot when the protection services and interposition driver 140 have not yet loaded, or in the case where for any reason the protection service 130 and interposition driver 140 fail to execute.

In examples, a computer system 100 may be provided with a plurality of ports for connecting peripheral devices, with one port or a plurality of the ports designated as protected ports 160. For example, certain ports may be designated as protected ports at design time, and could be labelled to indicate to a user a preferred port to use when connecting an untrusted, or potentially malicious, device. Ports may also be designated via a BIOS setting, or using a hardware switch to allow activation of the protection mechanisms for the port when connecting an untrusted device.

The protection provided by the protection service 130 to the protected port 160 may also extend to any hubs connected to the port and devices connected via those hubs.

A default policy may be to enumerate non-storage devices in response to a user accepting the device. However, further protection mechanisms may be applied such as emulating the specified device type from the sandboxed environment 120. This could limit the types of actions that the device could perform and allow monitoring of the device's behaviour even if the native device drivers would not allow or such actions.

Frequently used or known devices can be identified as trusted, for example based on some captured unique data that identifies the device, or some stored secret value, and allowed to bypass the protection service. Devices manufactured by certain trusted providers may be preprovisioned with a suitable secret value to allow those devices to bypass the protection service.

Figure 2:
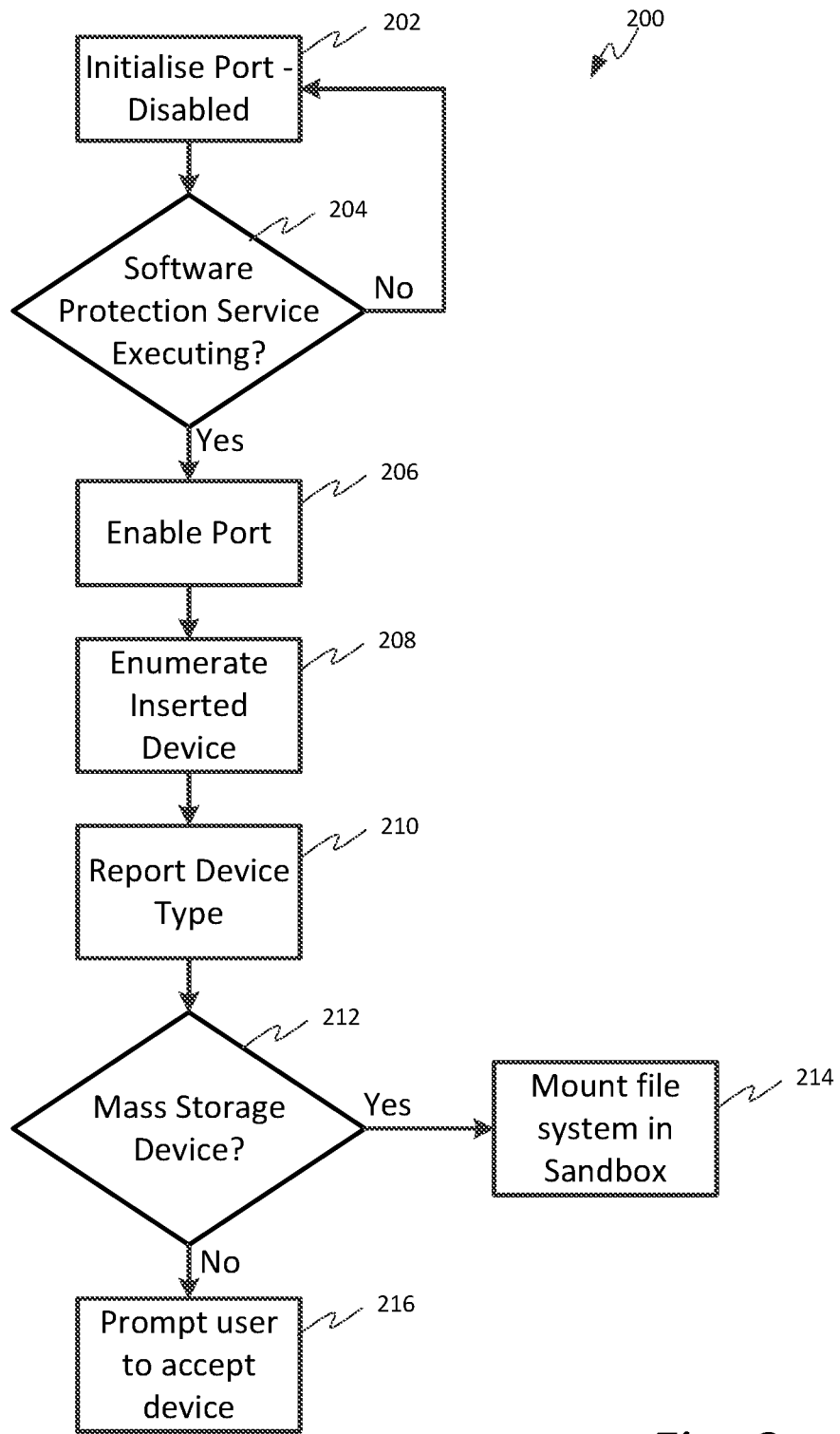
FIG. 2 shows a method according to an example of the disclosure.

FIG. 2 is a flow chart illustrating a method 200 according to an example of the present disclosure. According to the method 200, a protected port 160 is initialized 202 in a disabled state. The hardware security controller 150 monitors the software protection service 130 and interposition driver 140. If it is determined 204 that the software protection service 130 is executing, the port is enabled 206. A peripheral device 170 connected to the protected port 160 can then be enumerated 208. Interposition driver 140 gathers information about the enumerated device and reports 210 the details, including the device type, to the protection service 130. The protection service 130 then determines 212 whether the device comprises a mass storage device. If so, the file system of the device 170 is mounted 214 in the sandboxed filesystem 120. Else, the user is prompted 216 to accept the device, before the drivers for the device 170 can be loaded.

Figure 3:
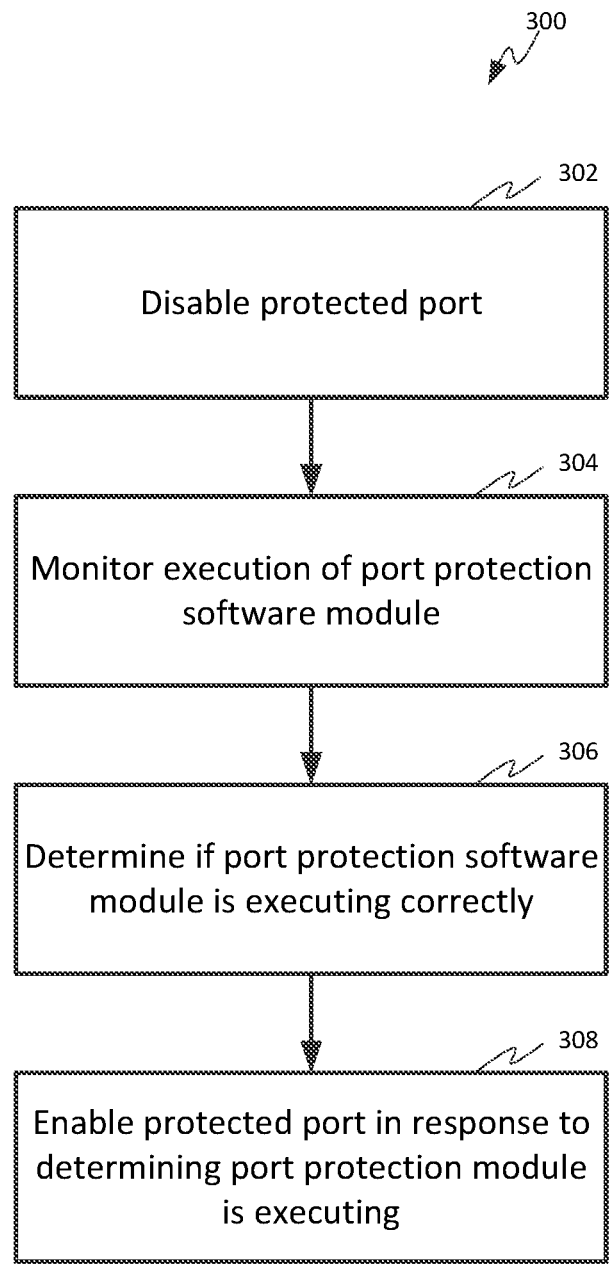
FIG. 3 shows a further method according to an example of the disclosure.
Figure 4:
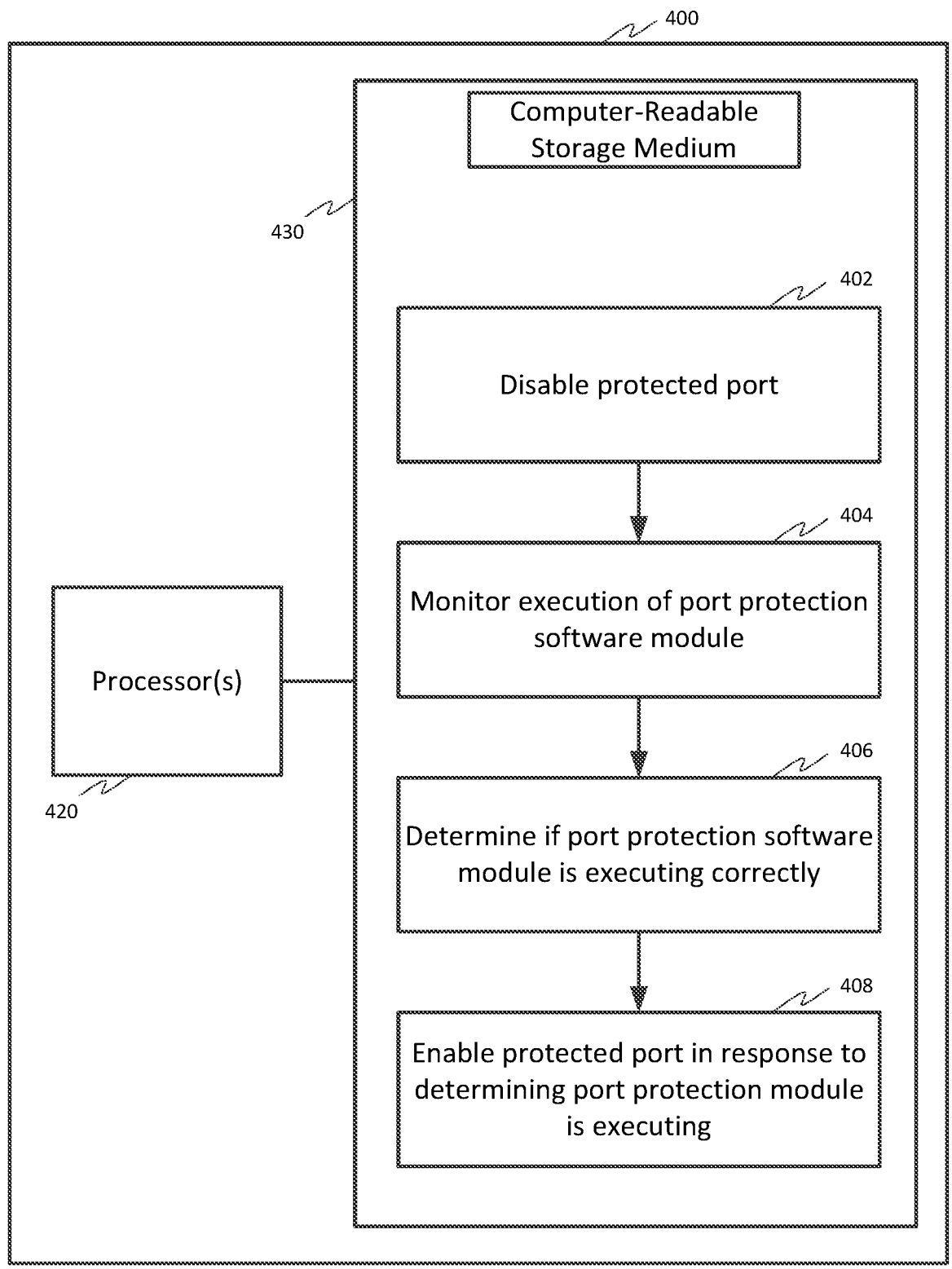
FIG. 4 is a schematic block diagram of a computer system according to an example of the disclosure.

FIG. 3 illustrates a method 300 performed by the hardware security controller 150 according to an example of the disclosure. According to the method 300 of FIG. 3, the security controller 150 disables 302 the protected port and then monitors 304 for execution of the port protection software module, e.g. the protection service 130 and the interposition driver 140. Once the security controller 150 determines 306 that the port protection software module is executing correctly, the security controller 150 enables the protected port to allow a peripheral device to be connected and enumerated onto the computer system under control of the port protection software module.

Certain methods and systems as described herein may be implemented by a processor that processes program code that is retrieved from a non-transitory storage medium, such as a BIOS firmware. FIG. 8 shows an example 800 of a device comprising a computer-readable storage medium 830 coupled to at least one processor 820. The computer-readable media 830 can be any media that can contain, store, or maintain programs and data for use by or in connection with an instruction execution system. Computer-readable media can comprise any one of many physical media such as, for example, electronic, magnetic, optical, electromagnetic, or semiconductor media. More specific examples of suitable machine-readable media include, but are not limited to, a hard drive, a random-access memory (RAM), a read-only memory (ROM), an erasable programmable read-only memory, or a portable disc.

In FIG. 8, the computer-readable storage medium comprises program code to perform a method corresponding to the example shown in FIG. 3, that is: disable 402 the protected port 160; monitor 404 for execution of the port protection software module; determine 406 if the port protection software module is executing correctly; and enabling 408 the protected port in response to determining the port protection module is executing.

All of the features disclosed in this specification (including any accompanying claims, abstract, and drawings) may be combined in any combination, except combinations where some of such features are mutually exclusive. Each feature disclosed in this specification, including any accompanying claims, abstract, and drawings), may be replaced by alternative features serving the same, equivalent, or similar purpose, unless expressly stated otherwise. Thus, unless expressly stated otherwise, each feature disclosed is one example of a generic series of equivalent or similar features.

The present teachings are not restricted to the details of any foregoing examples. Any novel combination of the features disclosed in this specification (including any accompanying claims, abstract, and drawings) may be envisaged. The claims should not be construed to cover merely the foregoing examples, but also any variants which fall within the scope of the claims.

The invention claimed is:

1. A computing system for interfacing with a peripheral device; the computing system comprising:
   a port configured to couple to the peripheral device, wherein the port is initialized in a disabled state;
   a processor;
   a memory comprising instructions that when executed cause the processor to:
   determine a device is connected to the port;
   receive information from the device, the information indicating a device detail, and wherein the device is prevented from connecting to the computing system except to provide the device detail;
   transmit a prompt to a user comprising the device detail, wherein the prompt requests a user approval for the device;
   access a shared secret value generated by a hardware security controller; and
   generate, by the processor, a cryptographic value indicating a protection service status based on the shared secret value; and
   the hardware security controller configured to:
   generate the shared secret value;
   receive the cryptographic value; and
   in response to determining the cryptographic value indicates a protection service is operational, enable the port.

2. The computing system of claim 1, wherein the computing system further comprises a software protection service and an interposition driver associated with the port, the interposition driver configured to:
  in response to a peripheral device being connected to the port, determine capabilities of the peripheral device; and
  report the determined capabilities to the software protection service.

3. The computing system of claim 1, wherein the peripheral device comprises a mass storage device and wherein the instructions when executed further cause the processor to prevent files stored on the mass storage device from executing on the processor.

4. The computing system of claim 3, wherein the instructions when executed further cause the processor to enumerate the mass storage device into a sandboxed filesystem.

5. The computing system of claim 1, wherein the peripheral device is a human interface device and wherein the instructions when executed further cause the processor to isolate inputs from the human interface device in a virtualized environment.

6. The computing system of claim 1, wherein the port is a USB port configured to couple to a USB peripheral device.

7. The computing system of claim 1, wherein the port is one of: an eSATA port, a PCIE port, or a Thunderbolt port.

8. The computing system of claim 1, wherein the instructions when executed further cause the processor to:
  in response to a peripheral device being coupled to the port, determine if the peripheral device comprises a known trusted device; and
  in response to determining that the peripheral device comprises a known trusted device, bypassing the protection service.

9. A method of protecting a computer system from a peripheral device, the method comprising:
  disabling, by a hardware security controller, a port;
    determining the peripheral device is connected to the port;
    receiving information from the peripheral device, the information indicating a device detail, and wherein the peripheral device is prevented from connecting to the computer system except to provide the device detail;
    transmitting a prompt to a user comprising the device detail, wherein the prompt requests a user approval for the peripheral device;
    generating, by the hardware security controller of the computer system, a shared secret value;
    accessing, by a processor of the computer system, the shared secret value, wherein the processor is distinct from the hardware security controller;
    generating, by a protection service executing on the processor, based on accessing the shared secret value, a cryptographic value indicating a protection service status;
  in response to determining, by the hardware security controller, that the cryptographic value indicates that the protection service is executing, enabling the port by the hardware security controller.

10. The method of claim 9, further comprising:
monitoring execution of a software protection service and an interposition driver associated with the port;
in response to the peripheral device being connected to the port, determining, by the interposition driver, capabilities of the peripheral device; and
reporting the determined capabilities to the software protection service.

11. The method of claim 10, further comprising:
in response to the reported capabilities indicating the peripheral device comprises a mass storage device, instantiating, by the software protection service, a sandboxed filesystem and loading a filesystem of the mass storage device into the sandboxed filesystem.

12. The method of claim 10, further comprising:
in response to the reported capabilities indicating the peripheral device does not comprise a mass storage device, indicating the reported capabilities of the peripheral device to a user and prompting the user to accept connection of the peripheral device.

13. The method of claim 10, further comprising:
in response to the reported capabilities indicating the peripheral device comprises a human interface device; and
isolating the human interface device in a virtualized environment.

14. The method of claim 9, further comprising:
determining, by the hardware security controller, that the protection service has stopped executing; and
in response to the determination that the protection service has stopped executing, disabling the port.

15. The method of claim 9, further comprising:
determining that the peripheral device comprises a known trusted device; and
bypassing protection provided by the protection service for the known trusted device.

* * * * *